Patented Nov. 2, 1926.

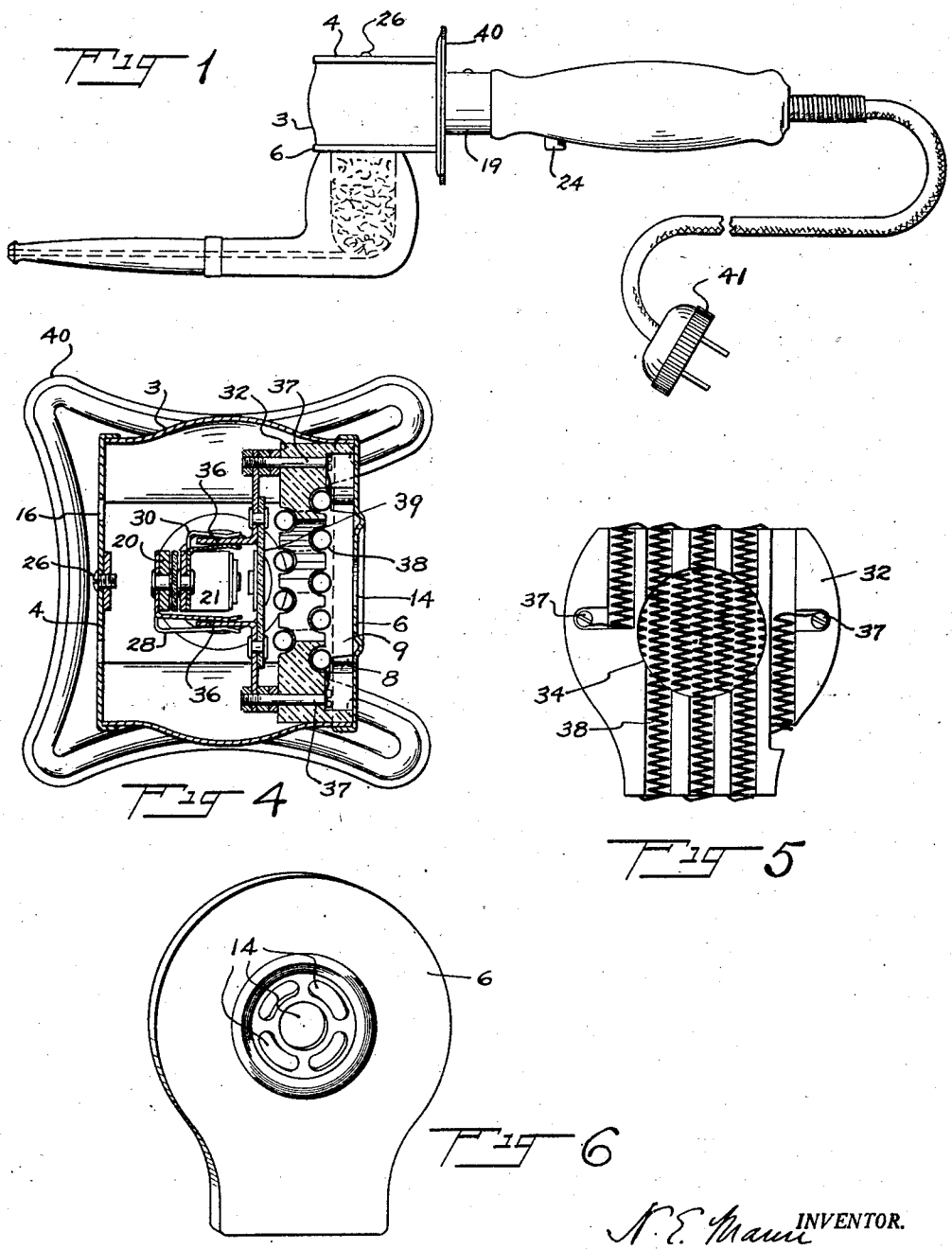

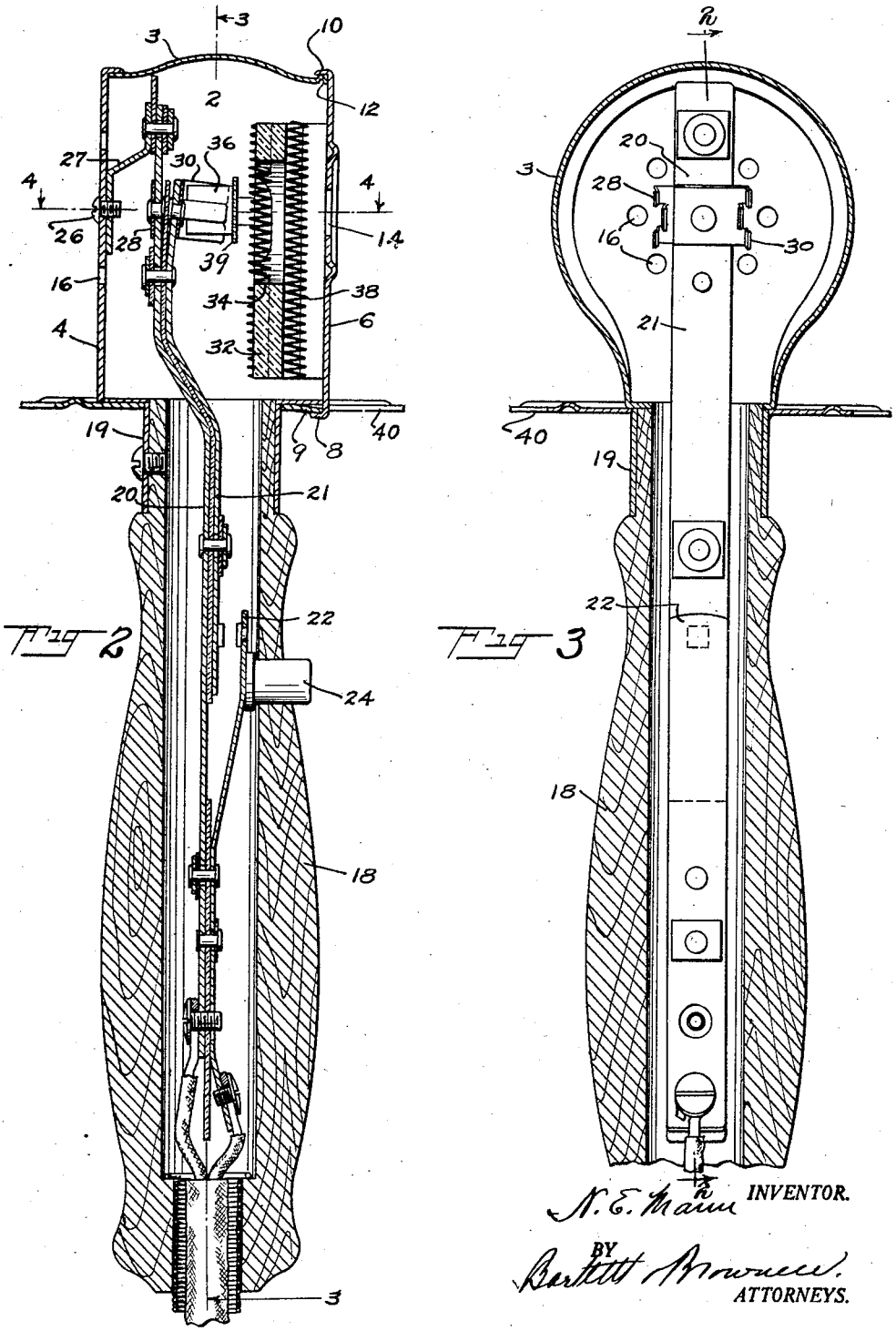

1,605,675

UNITED STATES PATENT OFFICE.

NELSON E. MANN, OF NEWINGTON, CONNECTICUT, ASSIGNOR, BY MESNE ASSIGNMENTS, TO MANNING, BOWMAN & CO., OF WILMINGTON, DELAWARE, A CORPORATION OF DELAWARE.

PIPE AND CIGAR LIGHTER.

Application filed April 20, 1925. Serial No. 24,658.

My invention relates to improvements in pipe and cigar lighters and has for its object to provide a lighter which will thoroughly ignite a cigar without having the cigar contact with incandescent material. Another object is to produce a cigar lighter which will also in a similar manner ignite the tobacco in a pipe. It further has for its object to provide a lighter which can be laid down without danger of damage by burning even though the controlling switch is kept closed so as to maintain the heating element incandescent. It further has for its object to provide a lighter having a new heating unit which is quick in action and can be easily removed and replaced or renewed. It further has for its object to provide a lighter in which the principal parts can be easily assembled and disassembled.

The following is a description of an embodiment of my invention reference being had to the accompanying drawings, in which:

Figure 1 shows in side elevation on a reduced scale the lighter applied to the bowl of a pipe;

Fig. 2 is a longitudinal section of the complete lighter on the line 2—2, Fig. 3 on an enlarged scale;

Fig. 3 is a longitudinal section of the complete lighter on the line 3—3, Fig. 2 with the heating unit removed;

Fig. 4 is a section on the line 4—4, Fig. 2;

Fig. 5 is a front detail view of the removable heating unit;

Fig. 6 is a detail view of the removable front face of the casing.

Referring more particularly to the drawings, 2 is a metallic casing having a wall 3 which carries a fixed side 4 and a removable side 6. The removable side has an upturned edge 8 engaging a slightly outturned edge 9 on the casing body, while the opposite portion of this side has an inturned edge 10 engaging with a snap action a slight protuberance 12 on the yielding wall of the casing, so as to be easily removable and replaceable.

The removable side of the casing is provided with a group of perforations 14 against which the end of a cigar or the mouth of a pipe is laid when the lighter is in use. The rear portion of the casing, preferably the rear side, is also provided with perforations 16 so that air can be drawn from the back of the casing through the perforations 14 in the front side. 18 is a handle entering a socket 19 secured to the casing wall. Passing through the handle and into the casing are two conductors 20, 21 insulated from one another, one of which comprises a switch 22 controlled by a button 24 in the handle. These two conductors are anchored to the rear side of the casing by suitable insulated means comprising a screw 26 and an insulated bracket 27. To the two conductors, respectively, are connected two jaw terminal contacts 28 and 30 projecting toward the front side of the casing and insulated from each other.

Within the casing is a removable heating unit comprising a skeleton base 32 extending substantially from side to side of the wall of the casing and consisting of insulating material such as lava, or the like, with a good sized perforation 34 therein, unit plug contacts 36 carried by binding posts 37 on said base and connected by a brace 39 of insulating material, such as mica. These plug contacts are adapted to engage the jaw terminal contacts 28 and 30, respectively, and a resistance element 38 is connected to said binding posts 37 and wound around the skeleton base so as to pass over the perforation 34 therein a plurality of times, so as to be exposed to air drawn through the perforation. By using a skeleton base I am able to secure several pairs of parallel strands of the resistance element grouped together so as to concentrate considerable heat upon the air passing toward the openings in the front face of the casing. The portions of the heating element on the rear of the base are staggered relatively to those on the front, as shown in Fig. 4 so as to substantially cover the perforation 36 as shown in Fig. 5 and yet be spaced apart as shown in Fig. 4. This heating unit can be slipped out of the casing and may be easily inserted in the casing so that its rear plug contacts engage the jaw terminal contacts before referred to.

After the removable unit is inserted and the front side of the casing is applied the lighter is in condition for use.

The conductors leading to the handle are connected to a plug 41 adapted to be placed in circuit with a source of current, such as an ordinary lighting socket, and when the switch 22 in the handle is closed by pressing the button, the circuit through the resistance element is closed. The several portions of the resistance element which are in front of and in back of the perforation in the insulating base and are thus in filament form being out of contact with the base and completely surrounded by air. They therefore become quickly incandescent and highly heat the air surrounding them, so that the casing constitutes a chamber containing in its central portion highly heated air. This air, when suction is applied to the openings of the front face by the application of the cigar or pipe, is drawn toward the tobacco and causes the same to ignite quickly and thoroughly. As soon as the button in the handle is released the circuit is broken at the switch 22 and the element cools off. The action is quick because the active parts of the resistance not being in contact with any solid cooling substance, but being in filament form, are quickly brought to incandescence and there being a substantial group of these incandescent filaments a considerable volume of air is quickly brought to a high heat.

In order to guard against possible danger of laying the lighter down while the switch is kept closed I provide a laterally protecting guard 40 which is affixed to the casing projecting on all sides, and so situated that the center of gravity of the lighter as a whole is on the handle side of the guard. I preferably place this guard on the side of the casing which is adjacent to the handle, as shown.

The resistance element 38 is preferably made of the well known nickel-chromium-iron wire commonly used in electric heating devices.

As will be evident to those skilled in the art, my invention permits of various modifications without departing from the spirit thereof or the scope of the appended claims.

What I claim is:

1. In a cigar lighter the combination of a casing having a removable front face, forwardly projecting contacts located in the rear of said casing, and conductors leading therefrom and adapted to be connected to an electrical circuit, a removable heating unit comprising a skeleton base of insulating material having on its rear face projecting contacts adapted to slidingly engage said forwardly projecting contacts, and a resistance element carried by said base having its ends connected to said base contacts and having portions exposed to air drawn through said skeleton base, said casing having perforations in the central portion of the front face thereof and in the rear of said resistance element.

2. In a lighter the combination of a casing, a heating unit therein comprising a skeleton insulating base, a resistance supported thereby having a plurality of parallel portions on opposite sides of said base and out of contact therewith so as to be completely surrounded by air, and contacts connected to said resistance, said casing having fixed thereto terminal contacts with which said base contacts are adapted to engage, and supply conductors connected to said terminal contacts.

3. A casing having two parallel sides, one of which is fixed and the other of which is removable, and a wall to which said sides are secured, a handle projecting from said wall, two conductors passing through said handle and having their inner ends removably connected to said fixed side, terminal contacts connected to said conductors respectively, and a removable heater unit comprising a skeleton base having a large opening for the passage of air and carrying rear contacts adapted to engage said terminal contacts and a resistance element connected to said rear contacts having portions crossing said opening, said case having perforations in said front side and in the rear of said resistance element.

4. In a cigar lighter, a casing having a suction opening in the central portion of its front face, a heating unit in said casing comprising a base having a large opening for the passage of air therethrough in line with said suction opening, and a heating element supported on said base having a group of parallel active filamentary portions crossing said openings in said base and face so as to be entirely surrounded by air.

5. In a cigar lighter, a casing having a suction opening in the central portion of its front face, a heating unit in said casing comprising a base having a large opening for the passage of air therethrough in line with said suction opening, and a heating element supported on both sides of said base having a group of parallel active filamentary portions in line with and crossing said openings in said base and face so as to be entirely surrounded by air, said filamentary portions being part on one side and part on the other side of said base, the portions on the opposite sides being in staggered relation.

In testimony whereof, I have signed my name to this specification this 17th day of April, 1925.

NELSON E. MANN.